US006653624B2

(12) United States Patent
Fukuda et al.

(10) Patent No.: US 6,653,624 B2
(45) Date of Patent: Nov. 25, 2003

(54) MASS SPECTROGRAPH

(75) Inventors: Mitsuaki Fukuda, Kyoto (JP); Kazuo Mukaibatake, Kyoto (JP); Masahiro Kojima, Shiga (JP)

(73) Assignee: Shimadzu Corporation, Kyoto (JP)

( * ) Notice: Subject to any disclaimer, the term of this patent is extended or adjusted under 35 U.S.C. 154(b) by 351 days.

(21) Appl. No.: 09/780,596

(22) Filed: Feb. 8, 2001

(65) Prior Publication Data

US 2001/0050336 A1 Dec. 13, 2001

(30) Foreign Application Priority Data

Jun. 5, 2000 (JP) ....................................... 2000-167139

(51) Int. Cl.[7] ........................... B01D 59/44; H01J 49/00
(52) U.S. Cl. .................... 250/288; 250/281; 250/423 R
(58) Field of Search ................................ 250/288, 281, 250/423 R

(56) References Cited

U.S. PATENT DOCUMENTS 5,844,237 A * 12/1998 Whitehouse et al. ....... 250/288
6,486,469 B1 * 11/2002 Fischer et al. .............. 250/288

* cited by examiner

*Primary Examiner*—Nikita Wells
(74) *Attorney, Agent, or Firm*—Beyer Weaver & Thomas LLP

(57) ABSTRACT

A mass spectrograph with an ionization chamber for having a sample liquid sprayed into and generating ions to be analyzed in a mass analyzing chamber for analyzing the generated ions has a peep-hole with a transparent pane provided on a wall of the ionization chamber. In order to prevent the pane from becoming cloudy and make it possible to clearly see the interior of the chamber, a tube is provided inside the chamber for blowing a dry gas onto the inner surface of the pane. The pane may be formed in the shaped of an image-enlarging lens and its inner surface may be coated with a thin film of polytetrafluoroethylene. An LED may be positioned inside the chamber such that the interior of the chamber can be seen clearly even if mass spectrograph is placed in a relatively dark room.

2 Claims, 2 Drawing Sheets

FIG. 1
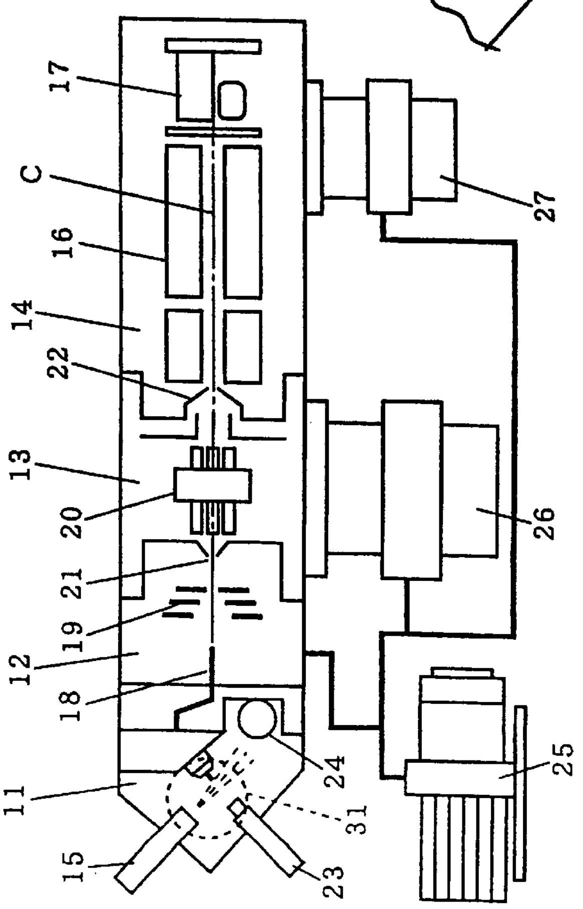
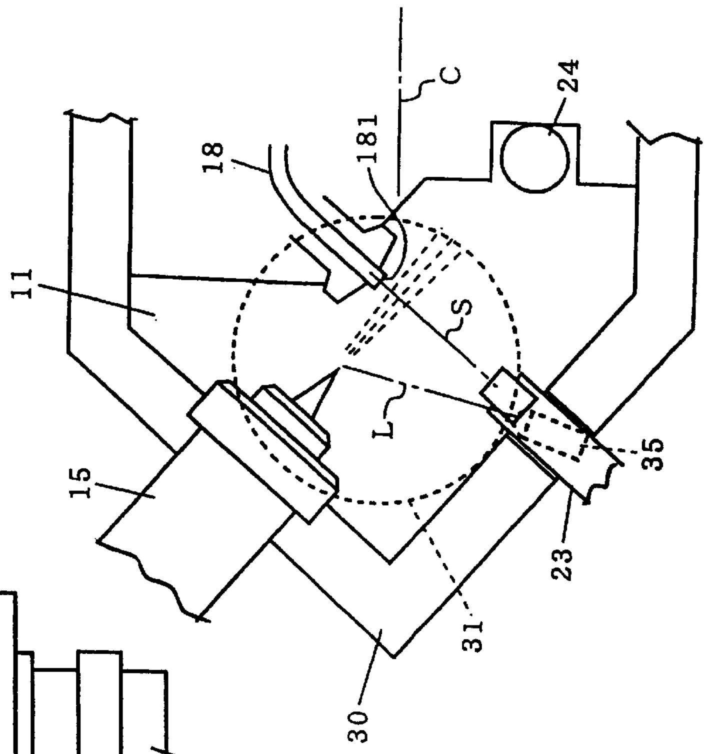
FIG. 2
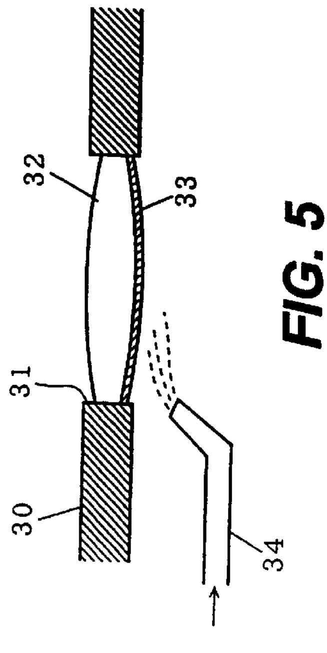
FIG. 5

MASS SPECTROGRAPH

BACKGROUND OF THE INVENTION

This invention relates to a mass spectrograph and more particularly to an atmospheric-pressure ionization interface which may be used, for example, for an liquid chromatograph-mass spectrograph (herein abbreviated as LC-MS).

A LC-MS makes use of an interface (herein referred to as LC-MS interface) for ionizing the sample liquid separated time-wise and eluting from the column of a liquid chromatograph (LC) and leading it to the mass spectrograph (MS). Such a LC-MS interface includes an ionization apparatus for generating gaseous ions while nebulizing the sample liquid by heating it or by using a high-speed gas flow or a strong electric field.

For the ionization in such a LC-MS, a so-called atmospheric pressure ionization method such as the atmospheric pressure chemical ionization method (APCI) or the electroless spray ionization method (ESI) is commonly used. By the APCI, a nozzle is connected to the end of the column of the LC so as to open into an ionization chamber maintained approximately at the atmospheric pressure, and a needle electrode is set in front of its front end. The sample liquid is heated and nebulized as it passes through the nozzle, and the droplets thus produced are ionized by a chemical reaction with the carrier gas ions (or "buffer ions") generated by a corona discharge from the needle electrode. By the ESI, an uneven electric field is generated by applying a high voltage of about several kV to the tip of the nozzle such that the sample liquid is dissociated by this electric field and become torn apart by the Coulomb force and nebulized. The solvent contained in the droplets is evaporated by contacting the ambient air such that gaseous ions are obtained.

In order to improve the efficiency of ion generation of such an apparatus for ionization, it is important, say, in the case of ESI, to appropriately adjust the positional relationship between the nozzle for nebulizing the sample liquid and the inlet of the solvent-removing tube for sucking in the ions generated from the nebulized droplets and transporting them to the next stage, as well as that of the glass capillary at the tip of the nozzle for transporting the sample liquid with respect to the metallic tube containing the capillary for applying a high voltage and nebulization gas tube provided coaxially on its outer circumference. For carrying out such adjustments, it is very convenience to make the interior of the ionization chamber observable from outside. For this reason, it has been known to provide a mass spectrograph with a peep hole with a transparent material such as glass on a selected surface of the ionization chamber such that its interior can be visible from outside. With the ionization chamber thus provided, not only is it convenient for the adjustments of aforementioned positional relationships but it also becomes possible to detect the contamination of the nozzle, whether or not the nebulization is taking place normally from the tip of the nozzle and, in the case of the ESI, whether or not the discharge is taking place at the specified position.

If the LC uses a mobile phase containing a large quantity of solvent such as water which is hard to vaporize, however, the solvent tends to cloud the transparent window by contacting or coming close to its inner surface after being sprayed out of the nozzle and gasified and thereby becoming suddenly cooled to condensate. Such a phenomenon is particularly significant in the case of the APCI wherein the interior of the ionization chamber reaches a very high temperature, making it difficult to observe its interior from outside. Since the distance between the peep-hole and the tip of the nozzle is at least several centimeters while the correction on the position of the tip of the nozzle must usually be carried out in units of millimeters, it is a difficult operation to make such a fine adjustment while observing the tip of the nozzle even if the peep-hole is not clouded. Moreover, the interior of the ionization chamber may be dark, depending on where the apparatus is set, because light from outside may not be able to penetrate the interior sufficiently through the peep-hole.

SUMMARY OF THE INVENTION

It is therefore an object of this invention in view of the problem as described above to provide a mass spectrograph of which the tip of the nozzle inside the ionization chamber is easily observable such that adjustments of positional relationships can be improved.

A mass spectrograph embodying this invention, with which the above and other objects can be accomplished, may be characterized as comprising not only a peep-hole on a wall of its ionization chamber but also a gas supplying means inside the ionization chamber for blowing a dry gas onto the inner surface of the peep-hole. It is preferable to provide the peep-hole with a pane serving as an image-enlarging lens and to coat the inner surface of the pane with a thin film of polytetrafluoroethylene. It is further preferable to provide an illuminating means such as an LED for illuminating the interior of the ionization chamber such that the interior of the ionization chamber can be clearly visible even when the spectrograph is placed inside a relatively dark room.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic structural diagram of a LC-MS embodying this invention;

FIG. 2 is an enlarged diagram of the interior of the ionization chamber of FIG. 1;

FIG. 5 is a partially sectional view of the neighborhood of the peep-hole.

DETAILED DESCRIPTION OF THE INVENTION

Figure 3:
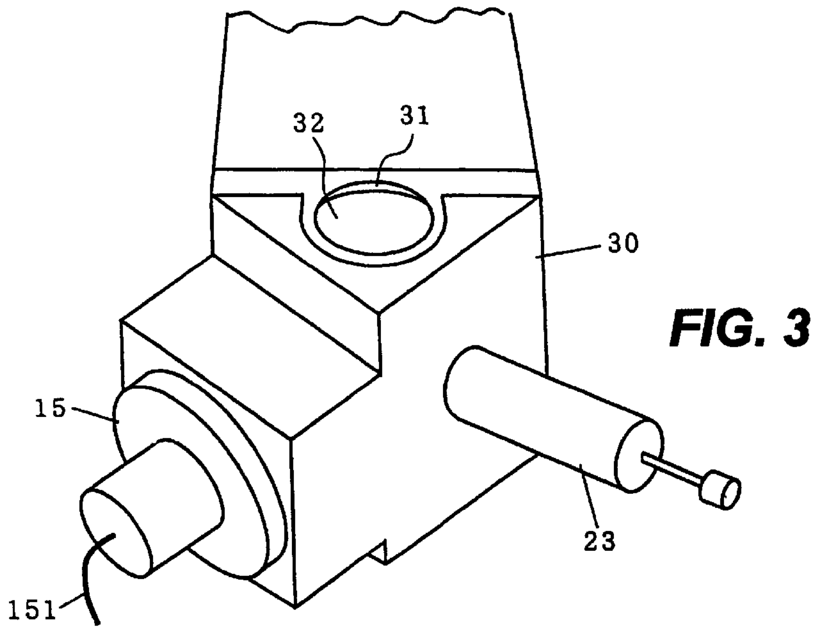
FIG. 3 is a diagonal external view of the chamber structure containing the ionization chamber inside.

The invention is described next by way of an example. FIG. 1 shows a LC-MS embodying this invention with an ionization chamber 11 and a mass analyzing chamber 14, as well as a first intermediate chamber 12 and a second intermediate chamber 13 which are both between the ionization chamber 11 and the mass analyzing chamber 14 and each separated by a partition wall. The ionization chamber 11 is provided with an ionization probe 15 connected to the outlet of a LC (not shown). The mass analyzing chamber 14 is provided with a quadrupole filer 16 and an ion detector 17. The first intermediate chamber 12 and the second intermediate chamber 13 are respectively provided with a first ion lens 19 and a second ion lens 20. The ionization chamber 11 and the first intermediate chamber 12 are connected only through a solvent-removing tube 18 with a small diameter. The first intermediate chamber 12 and the second intermediate chamber 13 are connected only through a skimmer 21 having a throughhole of an extremely small diameter.

The interior of the ionization chamber 11 is maintained approximately at an atmospheric pressure because of the gasified molecules of the sample liquid which are continuously supplied thereinto through the ionization probe 15. The interior of the mass analyzing chamber 14 is in a high vacuum condition of about $10^{-3}$–$10^{-4}$ Pa by means of a turbo molecular pump (TMP) 27. The intermediate chambers 12 and 13 are provided because of this large pressure difference between the ionization chamber 11 and the mass analyzing chamber 14 such that the pressure changes in a step-wise manner from the former to the latter. The interior of the first intermediate chamber 12 is kept at about $10^2$ Pa by means of a rotary pump (RP) 25 and that of the second intermediate chamber 13 is kept at about $10^{-1}$–$10^{-2}$ Pa by means of a turbo molecular pump (TMP) 26.

A sample liquid is sprayed into the ionization chamber 11 from the tip of the ionization probe 15 and the sample molecules are ionized while the solvent inside the liquid drops is vaporized. Both the generated ions and the small droplets which have not ionized are sucked into the solvent-removing tube 18 due to the pressure difference between the ionization chamber 11 and the first intermediate chamber 12. The electric field of the first ion lens 19 inside the intermediate chamber 12 serves not only to suck the ions through the solvent-removing tube but also to converge the ions near the throughhole of the skimmer 21.

The ions which have been introduced into the second intermediate chamber 13 through the throughhole of the skimmer 21 are converged and accelerated by the second ion lens 20 and thereafter transported into the mass analyzing chamber 14 through an small opening 22. Inside the mass analyzing chamber 14, only those ions having a specified mass number (the ratio of mass m to change z) are allowed to pass through the longitudinally elongated space at the center of the quadrupole filter 16 to reach the ion detector 17 by which they are detected.

As shown in FIG. 2, the central axis S of the inlet opening 181 of the curving solvent-removing tube 18 makes a downward angle of about 45 degrees with respect to the optical axis C of the downstream part. The ionization probe 15 for spraying the sample liquid, on the other hand, is attached to a chamber structure 30 containing the ionization chamber 11 inside in a direction nearly perpendicular to the axis S of the inlet opening 181. Also provided on the axis S of the inlet opening 181 is a shutter 23 adapted to undergo a reciprocating motion along the axis S, provided with an elastic member such as a rubber piece at the tip protruding into the ionization chamber 11. The shutter 23 is connected to a mechanical means (not shown) for causing the reciprocating motion of the shutter 23. When the shutter 23 is pushed farthest into the ionization chamber 11, the shutter 23 serves to completely close the inlet opening 181 of the solvent-removing tube 18. Numeral 24 indicates a drain disposed in front of the ionization probe 15 in the direction of spray therefrom for collecting the sprayed sample liquid. Although an ionization probe for ESI is shown in FIGS. 2 and 4, the ionization probe 15 is detachable from the chamber structure 30. In the case of an ionization process by the APCI, the ionization probe 15 shown in FIG. 2 is removed and another ionization prove (not shown) having a unitized needle electrode for discharge has only to be attached to the chamber structure 30 instead.

Figure 4A:
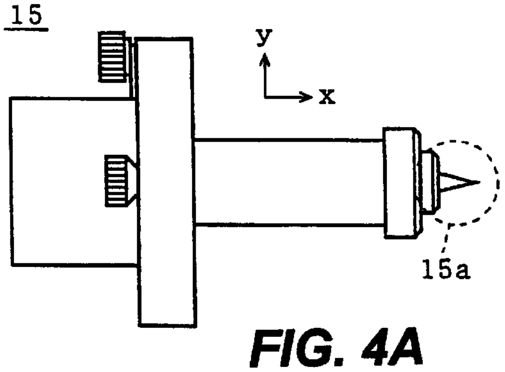
FIG. 4A is a front view and FIG. 4B is a left-hand side view of the ionization probe.
Figure 4B:
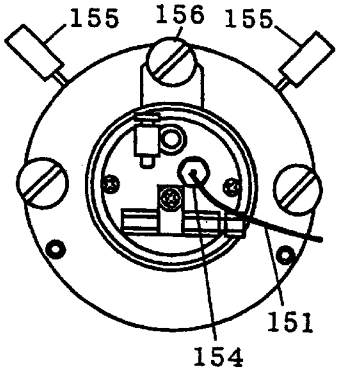
Figure 4C:
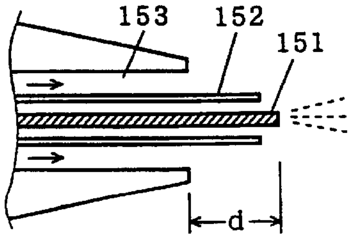
FIG. 4C is an enlarged sectional view of its tip part.

As shown in FIGS. 4A, 4B and 4C (summarily referred to as FIG. 4), there are two position-adjusting knobs 155 by means of which the tip part 15*a* of the ionization probe 15 can be moved within a specified range within a plane perpendicular to the x-axis (the axial direction of the ionization probe 15, as shown in FIG. 4A. Position-fixing knobs 156 are provided by means of which the position of the ionization probe 15 can be fixed after it has been adjusted as explained above. At the tip part 15*a*, a glass capillary 151 penetrates the interior of a SUS pipe 152 for applying a high voltage, and a nebulizing gas tube 153 for blowing out a nebulizing gas for assisting the spray of the sample liquid from the front end of the glass capillary 151 is provided outside this SUS pipe 152. The glass capillary 151 is arranged such that it can be pulled in and out along the x-axis by loosening a nut 154 for adjusting the distance d by which the glass capillary 151 protrudes from the front end of the SUS pipe 152.

As shown in FIGS. 2 and 3, a circular peep-hole 31 is provided on the upper surface of the chamber structure 30 such that the tip portions of the ionization probe 15 can be observed from outside, fitted with a glass pane 32. In other words, the chamber structure 30 is so designed that its interior, or the ionization chamber 11, can be observed from outside through this glass pane 32. In addition to the tip of the ionization probe 15, the inlet opening 181 of the solvent-removing tube 18 and the tip part of the shutter 23 are also included within the field of vision observable through the peep-hole 31. Thus, not only does the user's field of vision include the area necessary for adjusting the position of the ionization probe 15 as explained above but the user can also observe the spray from the probe 15 and ascertain whether the shutter 23 is securely closing the inlet opening 181 of the solvent-removing tube 18.

One of the features of the present invention is that the glass pane 32 of the peep-hole 31 comprises a convex (image-enlarging) lens, as shown in FIG. 5 such that, when the user looks inside the chamber structure 30 therethrough, the tip part 15*a* of the ionization probe 15 seems larger than it actually is, thereby making it easier to carry out fine adjustments of its position. As a second feature of the present invention, the inner surface of the glass pane 32, formed as a convex lens, is coated with a thin film 33 of polytetrafluoroethylene. Because the layer formed by this film 33 repels water and oils, it serves to prevent the droplets of solvent from becoming attached to the glass pane 32 to make it cloudy. It also serves to improve the useful lifetime of the lens itself.

As a further feature of the present invention, there is provided inside the chamber structure 30 a supply tube 34 for supplying a dray gas towards the inner surface of the glass pane 32. Although not illustrated, this supply tube 34 penetrates the wall of the chamber structure 30 and is connected through a flow rate adjusting valve to a supply source of a nebulizing gas (usually dry nitrogen gas) for spraying the sample liquid. In other words, the same gas as the nebulizing gas may be used as "the dry gas".

As the dry gas is blown onto the inner surface of the pane 32, the gas movement inside the pane 32 is invigorated. As a result, the gas with a large amount of droplets of the solvent contained therein is quickly removed from the neighborhood of the pane 32. These droplets are also quickly evaporated by the dry gas before being able to form any dews. As the dry gas is introduced into the ionization chamber 11 from other than the aforementioned nebulizing gas tube 153, furthermore, the inside pressure of the ionization chamber 11 increases, causing to increase the pressure difference between the inlet side and the outlet side of the drain 24 (usually equal to the atmospheric pressure). This has the effect of reducing the density of the solvent inside the ionization chamber 11 (or the humidity if the solvent is water) and hence of preventing the inside of the pane 32 from becoming cloudy. In summary, all these new features of the invention serve to effectively prevent the pane 32 of the peep-hole 31 from becoming cloudy, making is possible for the user to clearly observe the interior of the chamber structure 30.

As a further feature of this invention, an illuminating means is provided inside the ionization chamber 11. As shown in FIG. 2, an LED 35 serving as illuminating means is affixed to the wall surface of the chamber structure 30 immediately above where it is penetrated by the shutter 23, that is, between the shutter 23 and the peep-hole 31, such that its optical axis L will pass through the tip of the ionization probe 15. Thus, the tip of the probe 15 is designed to be illuminated most brightly. The LED 35 is of a kind adapted to emit white light such that the tip of the probe 15 will be clearly visible from outside even if the mass spectrograph is placed in a relatively dark room because the LED 35 can be switched on and illuminate the interior of the chamber structure 30. Since the LED 35 is set between the shutter 23 and the peep-hole 31, the shutter 23 is illuminated from above and the user can clearly ascertain whether the shutter 23 is securely blocking the inlet opening 181 of the solvent-removing tube 18.

Although this white LED 35 makes it easier to observe the manner of spray from the probe 15, it is preferable to provide another illuminating means for this purpose. According to a preferred embodiment of the invention, although not separately illustrated, a red LED is separately provided with its optical axis passing further in front of the probe 15. The user will thus turn on the white LED when adjusting the positional relationship of the probe 15 but it will be the red LED that will be switched on for checking the manner of spray. This makes it possible to check the manner of spray more clearly.

Although the invention has been described above with reference to only one example, this example is not intended to limit the scope of the invention. It goes without saying that many modifications and variations are possible within the scope of the invention and that such modifications and variations that may be apparent to a person skilled in the art are intended to be included within the scope of this invention.

What is claimed is:

1. A mass spectrograph comprising:

an ionization chamber;

means for spraying a sample liquid into said ionization and ionizing said sample liquid to generate ions; and a mass analyzing chamber for analyzing said generated ions;

wherein said ionization chamber has a peep-hole and contains therein illuminating means for illuminating inside said ionization chamber.

2. The mass spectrograph of claim 1 wherein said illuminating means include a red LED.

* * * * *